C. L. HUNSICKER.
FRUIT STEMMING MACHINE.
APPLICATION FILED NOV. 27, 1918.
1,302,374.
Patented Apr. 29, 1919.
2 SHEETS—SHEET 1.
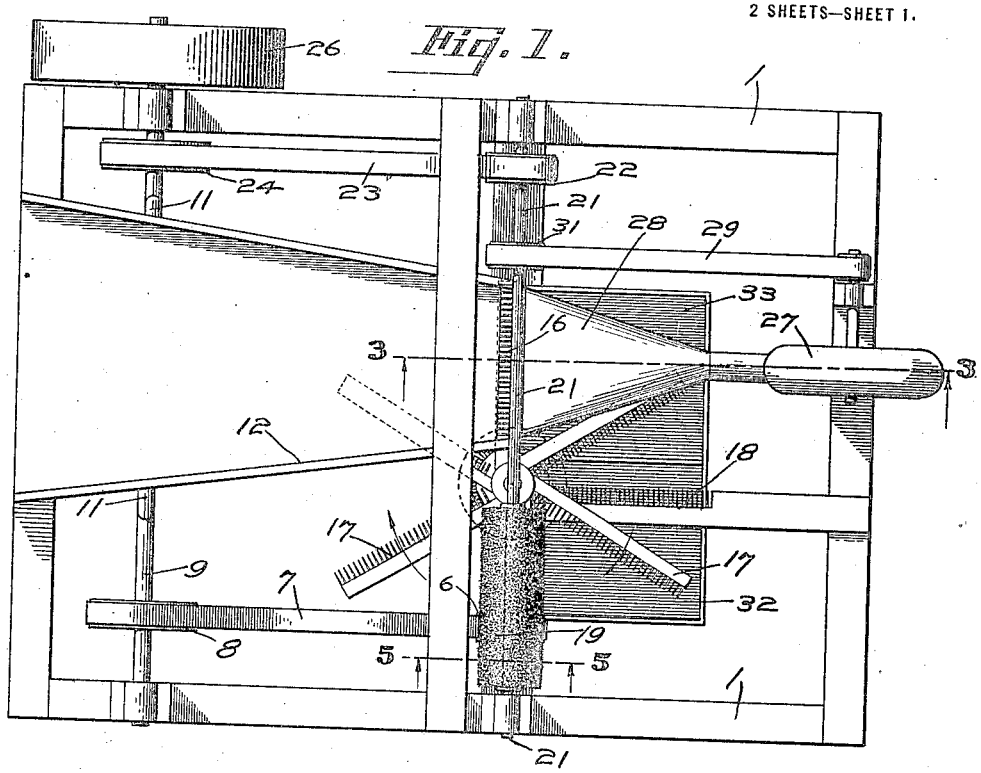
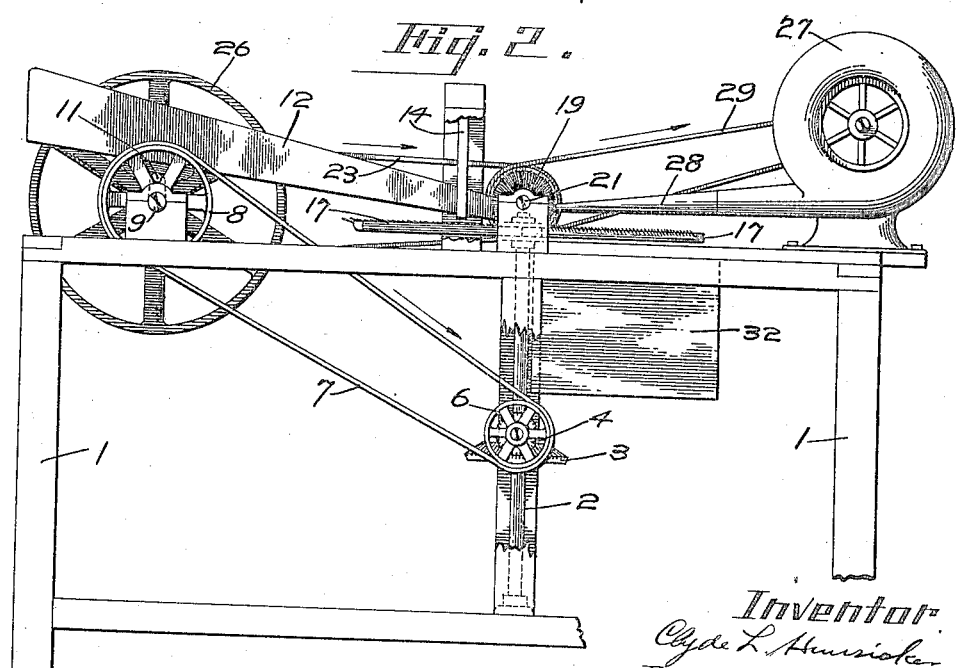
Inventor
Clyde L. Hunsicker
By Arthur L. Slee
Atty.

C. L. HUNSICKER.
FRUIT STEMMING MACHINE.
APPLICATION FILED NOV. 27, 1918.

1,302,374.

Patented Apr. 29, 1919.
2 SHEETS—SHEET 2.

Inventor
Clyde L. Hunsicker
By Arthur L. S. Lee
Atty.

UNITED STATES PATENT OFFICE.

CLYDE L. HUNSICKER, OF SAN FRANCISCO, CALIFORNIA.

FRUIT-STEMMING MACHINE.

1,302,374.  Specification of Letters Patent.  Patented Apr. 29, 1919.

Application filed November 27, 1918.  Serial No. 264,733.

*To all whom it may concern:*

Be it known that I, CLYDE L. HUNSICKER, a citizen of the United States, residing in the city and county of San Francisco, State of California, have invented a new and useful Improvement in Fruit-Stemming Machines, of which the following is a specification.

My invention relates to improvements in fruit stemming machines wherein rotating combs operate in conjunction with a stationary comb to strip fruit from the stems thereof.

The primary object of the present invention is to provide an improved device for removing the stems from cherries and the like.

The invention consists in a series of radial rotating combs upon which are suspended by their stems the fruit to be stemmed. These combs carry the suspended fruit into a stripping comb which strips the fruit from the stems, leaving the stems suspended from the rotating combs from which said stems are later stripped by a revolving brush.

A further object of the invention is to provide improved means for suspending cherries and the like by the stems from the rotating combs to facilitate the stripping process.

A still further object of the invention is to provide means whereby the fruit during its passage to the suspending means is acted upon and agitated so that the fruit is adapted to reach the suspending means in a position most favorable for the fruit's being caught and held on the suspending means by the stems.

I accomplish these several objects by means of the device disclosed in the drawings forming a part of the present specification wherein like characters of reference are used to designate similar parts throughout the said specification and drawings, and in which—

Figure 1 is a plan view of my improved machine;

Fig. 2 is a broken side elevation of Fig. 1;

Figure 3:
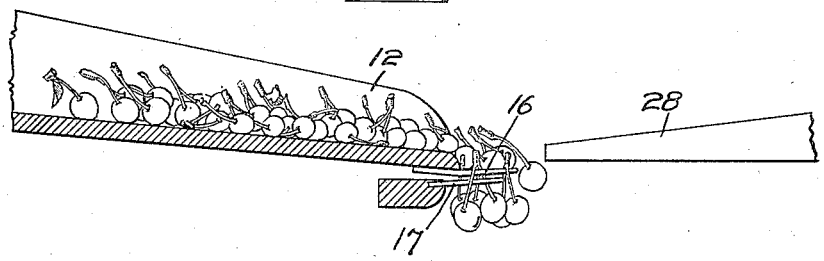
Fig. 3 is a sectional view taken on line 3—3 of Fig. 1 in the direction indicated.

Referring to the drawings the numeral 1 is used to designate a suitable frame having a vertically disposed shaft 2 rotatably mounted in the approximate center thereof and provided with a bevel gear 3 in mesh with and driven by a bevel pinion 4 connected to a suitable sheave 6 which is rotated by means of a belt 7 passing over a pulley 8 upon a horizontally disposed shaft 9 rotatably mounted upon the upper portion of the frame 1.

The shaft 9 is provided with a crank 11 pivotally connected to the bottom of one end of a shaker or feeding chute 12 pivotally suspended near the discharge end thereof by means of suitable links 14.

The front or discharge end of the feeding chute 12 is provided with a comb 16, the purpose of which will hereinafter be more fully set forth.

Carriers in the shape of radial combs 17 are secured to the upper end of the shaft 2 and move under the comb 16 on the edge of the chute 12.

In rotating the radial combs 17 move over a stationary stripping comb 18 arranged within the path of said rotating combs 17.

A revolving brush 19 is mounted directly over the path of the rotating radial combs 17 and is rotated by means of a horizontally disposed shaft 21 provided with a sheave 22 in turn rotated by means of a belt 23 passing over the sheave 22 and a pulley 24 on the horizontal or main shaft 9 hereinbefore mentioned. The main shaft 9 is provided with a driving pulley 26.

A blower 27 is provided with a nozzle 28 which directs a current of air onto the feeding chute 12 and onto the comb 16 on the front edge of the feeding chute, the purpose of which will hereinafter be more fully described.

The blower 27 is driven by a belt 29 passing over a pulley 31 on the shaft 21.

A suitable hopper 32 is arranged under the stripping comb 18 to receive cherries and the like as they are stripped from their stems. A similar hopper 33 is arranged under the comb 16 on the feeding chute 12 to receive cherries which fail to become suspended on the comb 16 so that said cherries may be returned to the chute and again fed into the machine.

In operation the shaft 9 is rotated to agitate the feeding chute 12, rotate the blower 27, revolve the brush 19, and rotate the radial combs 17 to pass the same under the combs 16, over the stripping comb 18 and under the revolving brush 19.

As the shaft 9 agitates the chute 12 by means of the crank 11 the cherries or other fruit to be stemmed or stripped are moved toward the discharge end of said chute. During the passage of the cherries down the chute, the cherries are further agitated and acted upon by the blast of air from the nozzle 28 of the blower 27 so that, as the cherries reach the discharge end of the chute, the cherries are adapted to be in advance of their respective stems, and as the cherries fall over the edge of the comb 16 the stems thereof are blown backward toward the comb 16 by the blast of air and thereby suspended from said comb 16 as disclosed in Fig. 3 of the drawings.

Figure 4:
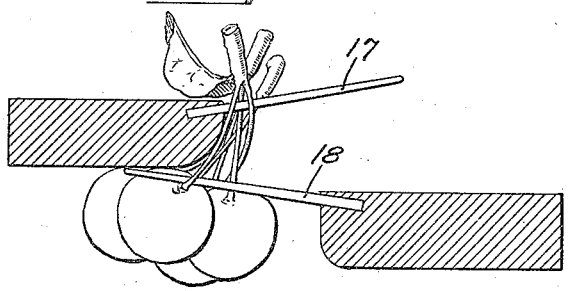
Fig. 4 is an enlarged vertical sectional view of one of the rotating carriers or combs operating in conjunction with the stripping comb.

As one of the radial rotating combs 17 pass under the comb 16 the teeth of said combs 17 coincide with the teeth of the comb 16 and thereby remove the cherries from said comb 16 onto the teeth of said comb 17. The cherries or other fruit then suspended by their stems from the radial rotating combs or carriers 17 are carried over the stationary stripping comb 18 whose teeth also coincide with the teeth of the combs 17, but as the teeth of the combs 16 and 17 are faced in opposite directions during such passage the cherries are engaged by the comb 18 and stripped from their suspended stems as disclosed in Fig. 4 of the drawings.

Figure 5:
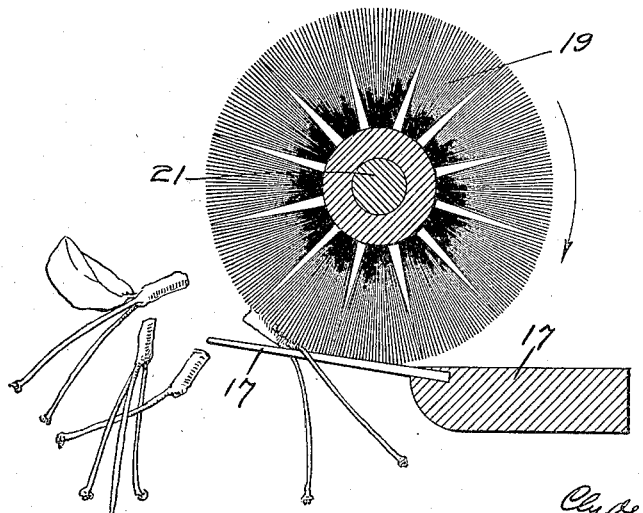
Fig. 5 is an enlarged vertical sectional view taken on line 5—5 of Fig. 1 in the direction indicated.

The combs 17 then pass on and under the revolving brush 19 which is rotated rapidly in a direction which will strip the cherry or fruit stems from the teeth of said combs 17 as disclosed in Fig. 5 of the drawings.

An important feature of the invention is that the blower 27 is so arranged as to act upon the fruit, not only when the fruit passes to the comb 16 from the discharge end of the feeding chute 12, but also when the fruit travels toward the discharge end, as in this way most of the fruit, when it reaches the discharge end, has already assumed the desired position for being held upon the comb 16 by the stems.

It is obvious from the foregoing that I have provided improved means for stemming cherries and the like as well as improved means for suspending said cherries, or the like, by means of their stems, from a comb from which they are removed again to be carried to the stripping mechanism.

Having thus described my invention, what I claim as new and desire to secure by Letters Patent is—

1. A fruit stemming machine comprising rotating combs; means for suspending fruit by the stems from the rotating combs; and a stripping comb arranged within the path of the rotating combs to strip the fruit from the stems.

2. A fruit stemming machine comprising rotating combs; means for suspending fruit by the stems from the rotating combs; a stripping comb arranged within the path of the rotating combs to strip the fruit from the stems; and means for stripping the stems from the rotating combs.

3. A fruit stemming machine comprising carriers; means for suspending fruit by the stems from the carriers; a stripping comb arranged within the path of the carriers to strip the fruit from the stems; and a stripping brush arranged in the path of the carriers to strip the stems therefrom.

4. A fruit stemming machine comprising carriers; feeding mechanism for suspending fruit by the stems from the carriers; a stripping comb arranged within the path of the carriers to strip the fruit from the stems when said carriers are moved past the stripping comb; and means for rotating the carriers to move them past the stripping comb to strip the fruit from the stems.

5. A fruit stemming machine comprising carriers; feeding mechanism for suspending fruit by the stems from the carriers; a stripping comb arranged within the path of the carriers to strip the fruit from the stems when said carriers are moved past the stripping comb; means for rotating the carriers to move them past the stripping comb to strip the fruit from the stems; and means for stripping the stems from the carriers after the fruit has been stripped from said stems.

6. A fruit stemming machine comprising carrier combs; means for suspending fruit by the stems from said carriers; a stripping comb arranged within the path of the carriers and arranged to engage the fruit and strip the same from the stems when the carriers are moved past the stripping comb; a revolving brush arranged adjacent the path of the carriers to strip the stems therefrom after the fruit has been stripped from the stems; and means for moving the carriers past the stripping comb to strip the fruit from the stems and then past the revolving brush to strip the stems from the carriers.

7. A fruit stemming machine comprising radial rotating carrier combs; a feeding mechanism arranged over the path of the rotating combs; a comb secured to the end of the feeding mechanism; a blower arranged to blow the stems of the fruit onto the comb on the feeding mechanism when said fruit is passing from said feeding mechanism; a stationary stripping comb arranged within the path of the rotating combs and adapted to engage the fruit and strip the same from the stems when the rotating combs are passed adjacent the stripping comb; a revolving brush arranged adjacent the path of the rotating combs and arranged to strip stems from said combs when said rotating combs are passed thereunder; and means for rotating the radial combs and the brush whereby fruit may be stripped from the stems and the stems from the rotating combs after the fruit has been stripped from said stems.

8. A fruit stemming machine comprising carriers; means for feeding fruit to the carriers; means for suspending the fruit by the stems from the carriers; means acting upon the fruit in the feeding means so that the fruit is adapted to reach the suspending means in a position most favorable for holding the fruit on the suspending means by the stems of the fruit; and a stripping comb arranged within the path of the carriers for stripping the fruit from the stems.

9. A fruit stemming machine comprising carriers; means for feeding fruit to the carriers; means for suspending the fruit by the stems from the carriers; means acting upon the fruit when the fruit is in the feeding means and when the fruit passes from the feeding means so that the fruit is adapted to reach the suspending means in a position most favorable for holding the fruit on the suspending means by the stems of the fruit; and a stripping comb arranged within the path of the carriers for stripping the fruit from the stems.

In witness whereof, I hereunto set my signature.

CLYDE L. HUNSICKER.

Copies of this patent may be obtained for five cents each, by addressing the "Commissioner of Patents, Washington, D. C."